May 29, 1934. S. E. OLENICK 1,960,709
ENGINE VALVE
Filed July 23, 1931
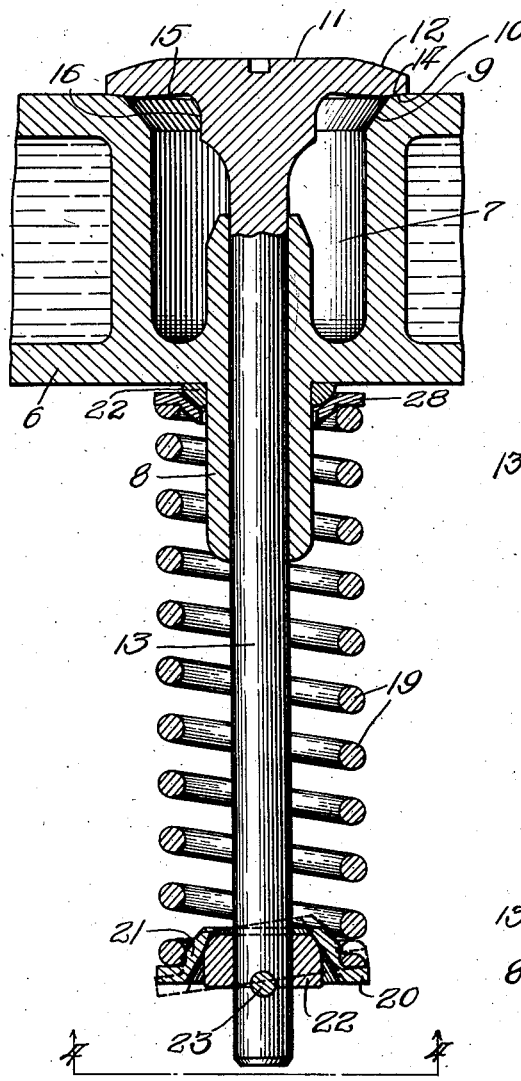
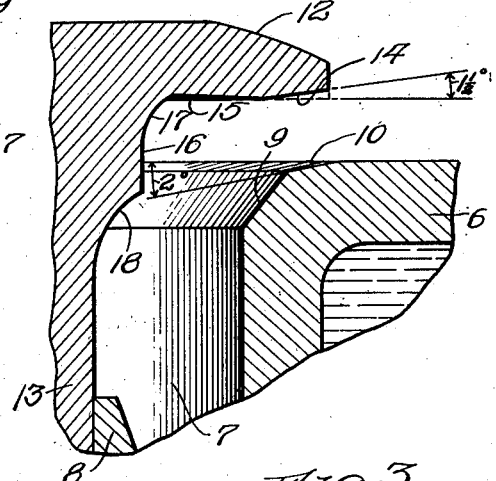
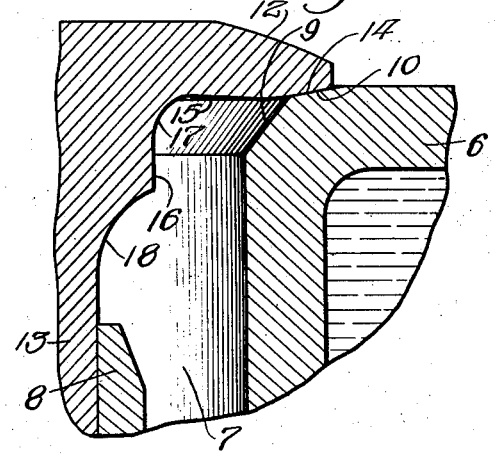
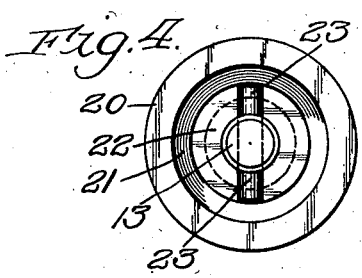
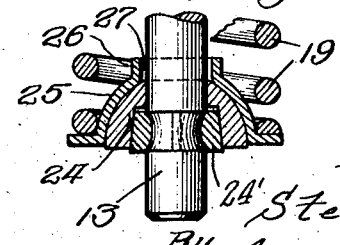
Inventor:
Steve E. Olenick
By Glenn S. Noble
Atty.

Patented May 29, 1934

1,960,709

UNITED STATES PATENT OFFICE 1,960,709

ENGINE VALVE

Steve E. Olenick, Chicago, Ill., assignor to Boyle Valve Company, Chicago, Ill.

Application July 23, 1931, Serial No. 552,598

7 Claims. (Cl. 123—188)

This invention relates to valves of the poppet type particularly intended for internal combustion engines and to means for connecting the springs with the valve stems whereby a straight or lineal pull will be provided on the stems. Certain features of the valves make them particularly applicable for exhaust purposes. Heretofore there have been two principal types of valves used, one providing a flat seat or seat at 90° to the center of the valve stem and the other type commonly known as tapered or conical valves which have their seats at acute angles to the stems. The principal advantage of a flat seat valve is the quicker opening or the provision of a larger opening with less movement of the valve. However, with this type, the face of the valve strikes the seat at right angles and there is no relative movement between the same and any particles such as carbon or the like, which may collect on the face of the valve or the valve seat are apt to become embedded in one or the other and are also apt to prevent the closing of the valve at this particular point, such failure to close being one of the principal causes for valve trouble.

While the conical or tapered valves have been more generally used as they may generally be made to operate with some degree of satisfaction, with less cost than flat seat valves, they are also objectionable in failing to provide as large a discharge opening and are also found objectionable on account of increased wear or rubbing action between the valve and the seat. In accordance with the present invention I provide a valve which is substantially different from either of these types but which embodies the principal advantages of both of the types.

Poppet valves or engine valves of this character are usually actuated and held in closed position by means of cylindrical valve springs. These springs are arranged to abut at one end on a portion of the engine and at the other end usually engage with a collar secured to the valve stem. These springs are never uniform in action, due to the nature of the springs and the method of finishing the ends, but always tend to press unevenly on the collar and consequently tend to throw the stem out of alignment with the guide thereby causing wear on the stem and the guide. This wear eventually permits the valve to be tipped so that it will not close uniformly and thus provides another source of trouble or difficulty.

In accordance with the present invention, I also provide a ball and socket or universal joint connection between one end of the spring and the block and between the free end of the spring and the stem whereby the spring pressure will tend to move the stem longitudinally and without lateral deflection.

The objects of this invention are as above indicated, to provide an improved valve and also one which may be economically manufactured and which will be durable in operation; to provide a valve with the lower portion of the head and the connection between the head and stem formed to deflect the heated gases and to prevent injury to the valve or stem or stem guide; to provide a valve having its seat or engaging portion at an angle or slightly less than ninety degrees to the axis of the stem; to provide an engine having a valve seat at a comparatively slight angle to the face of the block and having a valve with its engaging portion at a less angle whereby the valve will make contact around its outer periphery; to provide means for causing a uniform tension in a straight line on the valve stem; and to provide such other novel features of construction and improvements in operation as will appear more fully from the following description.

In the accompanying drawing illustrating this invention;

Figure 1 is a sectional view of a portion of an engine showing my improved valve construction;

Figure 2 is an enlarged sectional view of the head and valve seat showing the valve in open position;

Figure 3 is a view similar to Figure 2 showing the valve in closed position;

Figure 4 is an end view taken on the line 4—4 of Figure 1; and

Figure 5 is a detail showing a modified form of valve stem collar or universal joint.

As shown in this drawing, 6 represents an engine block of a portion of an engine having a port 7 representing either an inlet or an outlet. The engine is provided with a valve stem guide 8. The port or outlet 7 is preferably provided with a tapered or conical portion 9 around the upper end such as commonly provided for a tapered or conical valve. The valve seat 10 in the present instance surrounds the conical portion 9 and comprises an area heretofore used for flat seat valves which, as above suggested, was at ninety degrees to the axis of the valve. In the present instance, this seat is tapered at a slight angle or preferably approximately two degrees from normal, as shown in Figure 2, although this angle may be varied in accordance with the present disclosure.

The valve 11 comprises a head portion 12 and stem 13. The lower face of the valve is provided around the periphery with a seating portion 14 which is at a slight angle to the normal as shown in Figure 2, this portion being adapted to engage with the seat 10 on the block 6. This angle is preferably less than the angle of the seat, being shown at one and one-half degrees, or such that when the valve closes it will make contact around the extreme outer periphery, leaving a slight wedge-shaped opening of one-half degree between the seats.

The adjacent lower surface of the valve as shown at 15 is also arranged at an angle to the normal, being tipped upwardly toward the center, or opposite from the angle of the seat 14. The head and stem are joined by a substantially cylindrical portion or section 16 which is considerably larger than the stem and which unites with the surface 15 by a curved portion 17 and with the stem by means of a curved portion 18.

The lower end of the valve spring 19 engages with a flange 20 on a spring retainer or socket member 21 which coacts with a ball or collar 22 having a curved upper surface to permit a rocking movement of the ring or socket member 21. The collar 22 is secured to the stem 13 in any common or well known manner, as by means of a pin 23 which is arranged so that the retaining parts are securely locked to the valve stem so that they will not become loosened or displaced in operation. This provides a universal joint between the spring and the stem whereby the lower end of the spring will automatically adjust itself to the stem and thus prevent side pressure or irregular action of the spring on the stem. The upper end of the spring 19 may abut against the lower face of the block 6 in some instances, but I prefer to provide a universal joint or connection at the upper end also.

In the arrangement shown, a bearing or collar 22 is provided on the lower face of the block and may be formed integrally therewith, or separately therefrom, as shown. A disc or socket member 28 coacts with this bearing or collar and is cupped or dished so that it will rock or oscillate thereon. The upper end of the spring 19 engages with such collar whereby the upper end of the spring will have a universal joint or connection as well as the lower end.

In the modification of this joint shown in Figure 5, the collar 24 is shown as being substantially hemispherical and the socket or ring 25 which fits over the same is provided with an upwardly projecting flange 26 providing an opening 27 for the stem, which opening is sufficiently large to permit the necessary play but which will prevent too great movement between the socket and the stem.

In this particular form the collar 24 has an annular recess in the lower portion thereof which fits over coacting locking members 24' that engage with a groove in the valve stem, this being also a well known means for securely locking the spring retainer to the stem. In this connection it will be noted that particularly with high speed engines the movement of the valve stem is so rapid that there may be a lag in the movement of the spring which would permit the tension on the spring retainer to be temporarily relieved, which necessitates the secure locking of the retainer to the stem.

While the valve is adapted for both inlet and exhaust ports it will be described in connection with the exhaust. When the valve opens as shown in Figure 2, it is noted that the hot exhaust gases tend to pass out between the outer portion of the valve and the valve seat in a substantially horizontal plane. On account of the slight upward deflection of the adjacent valve surface 15, the gases will tend to pass this area without engagement therewith and consequently do not tend to heat the valve at this point. The major portion of the gases strike the cylindrical enlargement 16 which is sufficiently thick so that the heated gases cannot readily injure the same and the heat imparted to this portion of the valve will be gradually dissipated through the adjacent portions. When the gases strike this enlarged portion they will be deflected downwardly and away from the stem and also away from the upper end of the valve guide. This prevents the burning of the stem which frequently occurs at this portion and also prevents undue wear at the upper portion of the guide.

The valve closes under the action of the spring 19 which through the intermediary of the universal joints causes the stem to move downwardly without side tension or pressure as occurs with the usual forms of construction. This further tends to reduce wear or binding of the valve stem in the guide. It will be noted that the terms upwardly and downwardly have been used in this connection for convenience in describing the form of valve illustrated but the application of the invention to overhead valves or valves otherwise positioned will be readily apparent to those familiar with such constructions.

While Figure 2 illustrates the preferred bevel or taper on the valve and the preferred bevel or taper on the valve seat, it is apparent that if the valve is ground in there will be a tendency to reduce or minimize the bevel so that the parts will come together throughout the contact surface or area as indicated in Figure 3, or if a valve is not ground-in the natural wear will tend to bring these parts to fit or the surfaces to parallelism but the important thing is that in any event contact will first be established around the outer edge of the valve seat rather than at the inner edge. On account of this arrangement any particles striking the valve seat will be blown out or will tend to be dislodged and will not remain on the seat. It will also be noted that on account of the taper there will be a slight movement or rubbing action of the valve on the seat which tends to keep the valve tight.

Having thus described my invention, what I claim and desire to secure by Letters Patent is:

1. An equalizer for a valve spring comprising a collar, means for locking the collar to the valve stem and a ring adapted to oscillate in all directions on the collar and to be engaged by the end of the spring to equalize the tension of the spring on the stem and prevent side pressure.

2. In a device of the character set forth, the combination of a collar, means for securely fastening the collar to a valve stem and a socket fitting over the collar and adapted to have universal movement thereon and to be engaged by the end of the valve spring.

3. In an engine, the combination with the engine block, of a valve having a stem, a spring for the valve, a universal joint between one end of the spring and the block and a universal joint connection between the opposite end of the spring and the valve stem which is locked to the stem to prevent accidental displacement thereof.

4. The combination with a valve spring for an engine which coacts with a valve having a stem operating in a fixed guide, of the character set forth, of a universal joint between the spring and the engine block.

5. The combination with an engine having a valve and valve spring, of a fixed guide for the valve stem, a bearing collar around the guide, a socket engaging with the bearing collar and having a universal movement thereon and forming an abutment for one end of the spring.

6. In a spring tension equalizer for internal combustion engines, the combination with a valve having a valve stem and a coil spring coacting therewith, of an annular member engaging with the stem, means for locking the member to the stem, and a spring retainer engaging with the spring and with said annular member and having a universal oscillating movement on said member whereby the tension on the stem is equalized and the valve is drawn against the seat with uniform contact around the periphery thereof.

7. The combination with a valve for an internal combustion engine having the usual stem and coil spring coacting therewith, of a collar fitting closely on the stem, means for fastening the collar securely to the stem, and a cup shaped spring retainer engaging with the spring and fitting over the collar and adapted to have universal movement on the collar whereby the retaining means will be securely fixed to the stem and will equalize the tension of the spring on the stem.

STEVE E. OLENICK.